(12) United States Patent
Niessner et al.

(10) Patent No.: US 6,541,573 B1
(45) Date of Patent: Apr. 1, 2003

(54) METHOD FOR ELIMINATING FORMAMIDE FROM POLYMERIZATES CONTAINING N-VINYL FORMAMIDE UNITS

(75) Inventors: Manfred Niessner, Schifferstadt (DE); Martin Rübenacker, Altrip (DE); Norbert Mahr, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/762,397

(22) PCT Filed: Aug. 11, 1999

(86) PCT No.: PCT/EP99/05902

§ 371 (c)(1), (2), (4) Date: Feb. 7, 2001

(87) PCT Pub. No.: WO00/09573

PCT Pub. Date: Feb. 24, 2000

(30) Foreign Application Priority Data

Aug. 14, 1998 (DE) .......................................... 198 36 992

(51) Int. Cl.⁷ .............................. C08F 6/00; C08J 11/02
(52) U.S. Cl. ............................. 525/328.2; 525/328.3; 525/328.4; 525/355; 525/369; 525/378; 525/379
(58) Field of Search ........................... 525/328.2, 328.3, 525/328.4, 355, 369, 378, 379

(56) References Cited

U.S. PATENT DOCUMENTS

| | | | | |
|---|---|---|---|---|
| 4,421,602 A | * | 12/1983 | Brunnmueller et al. ..... 162/168 |
| 4,774,285 A | * | 9/1988 | Pfohl et al. ................... 525/60 |
| 5,008,321 A | * | 4/1991 | Hartmann et al. .......... 524/378 |
| 5,334,287 A | * | 8/1994 | Hartmann et al. .......... 162/175 |
| 5,478,553 A | * | 12/1995 | Chandran et al. ............. 424/70 |
| 5,769,959 A | * | 6/1998 | Johnson et al. ............... 134/22 |

FOREIGN PATENT DOCUMENTS

| | | | |
|---|---|---|---|
| CA | 2034655 | * | 7/1991 |
| CA | 2040601 | * | 10/1991 |
| CA | 2217295 | * | 11/1996 |
| CA | 2221515 | * | 2/1997 |
| DE | 196 12 432 | * | 10/1996 |
| DE | 195 26 626 | * | 1/1997 |
| DE | 195 15 943 | * | 11/1998 |
| EP | 216 387 | * | 4/1987 |
| EP | 374 646 | * | 6/1990 |
| EP | 438 744 | * | 7/1991 |
| EP | 452 758 | * | 10/1991 |
| EP | 473 881 | * | 3/1992 |
| EP | 510 246 | * | 10/1992 |

* cited by examiner

Primary Examiner—D. R. Wilson
(74) Attorney, Agent, or Firm—Keil & Weinkauf

(57) ABSTRACT

A process for the elimination of formamide from polymers containing N-vinylformamide units involves treating formamide-containing polymers with from 1 to 2 mol-equivalents of an acid or a base, based on 1 mol-equivalent of formamide, under reaction conditions such that the N-vinylformamide units in the polymer undergo virtually no hydrolysis.

11 Claims, No Drawings

METHOD FOR ELIMINATING FORMAMIDE FROM POLYMERIZATES CONTAINING N-VINYL FORMAMIDE UNITS

The invention relates to a process for the elimination of formamide from polymers containing N-vinylformamide units by treatment of the polymers contaminated with formamide with acids or bases.

Polymers containing N-vinylformamide units are known. They are prepared by free-radical polymerization of N-vinylformamide, optionally in the presence of other monoethylenically unsaturated monomers which are copolymerizable therewith, cf. U.S. Pat. No. 4,421,602, EP-A-0374646, EP-A-0438744, EP-A-0473881, EP-A-0510246, U.S. Pat. No. 5,334,287, DE-A-19526626 and DE-A-19515943. The polymers can be prepared, for example, by polymerizing monomers by solution polymerization, precipitation polymerization or also by the process of water-in-oil emulsion polymerization. Polymers containing vinylformamide units are in many cases converted by treatment with bases or acids at relatively high temperatures with removal of the formyl group from the copolymerized vinylformamide units in polymers containing vinylamine units. Thus, for example, according to U.S. Pat. No. 4,421,602, homopolymers of N-vinylformamide are converted, with removal of from 10 to 90 mol % of the formyl groups, into polymers containing vinylamine and vinylformamide units. The removal of formyl groups from copolymers of N-vinylformamide using other ethylenically unsaturated monomers is known from EP-A-0216387. It takes place in the presence of acids or bases at from 20 to 100° C. Depending on the reaction conditions used, the reaction leads to partial or complete removal of formyl groups with formation of amino groups from the polymers containing vinylformamide groups. If the polymers contain formamide as impurity, during removal of the formyl groups from the polymers containing vinylformamide units, hydrolysis of the formamide also takes place, meaning that the polymers containing vinylamine units are virtually no longer contaminated with formamide.

U.S. Pat. No. 5,478,553 discloses the use of polymers containing N-vinylformamide units as conditioners and as setting compositions and gel formers for hair care. EP-A-0452758 describes the use of polymers containing N-vinylformamide units as auxiliary in cosmetic and pharmaceutical preparations. For such intended uses, however, the polymers must not contain any physiologically unacceptable impurities such as, for example, formamide. As a result of the preparation, N-vinylformamide contains formamide as impurity, which cannot easily be removed from the monomer using distillation. For this reason, the N-vinylformamide containing small amounts of formamide is polymerized. The problem following polymerization is then to purify the polymer from residual formamide.

It is an object of the present invention to provide a process for removing formamide from polymers containing N-vinylformamide units, the intention being for the N-vinylformamide units in the polymer to remain completely intact as far as possible.

We have found that this object is achieved by a process for the elimination of formamide from polymers containing N-vinylformamide units if polymers containing formamide are treated with from 1 to 2 mole-equivalents, based on 1 mole-equivalent of formamide, of an acid or a base under reaction conditions such that the N-vinylformamide units in the polymer undergo virtually no hydrolysis.

The polymers containing N-vinylformamide units can here be in the form of an aqueous solution, a solution in a water-soluble solvent or also in mixtures of water and a water-soluble solvent, an aqueous suspension or a water-in-oil emulsion. The polymer content in these systems is, for example, from 3 to 50% by weight, preferably from 5 to 30% by weight. The content of formamide in the polymer essentially depends on the amount of copolymerized N-vinylformamide. It is, for example, from 0.001 to 7.5% by weight, preferably from 0.01 to 3.0% by weight and in most cases from 0.02 to 0.5% by weight. Polymers containing N-vinylformamide units are known, for example, from the literature references given above in the prior art. The novel process can be used for all polymers which contain copolymerized N-vinylformamide. Suitable polymers are homo- and also copolymers of N-vinylformamide and also graft copolymers thereof. Suitable examples of possible comonomers for N-vinylformamide are other N-vinylcarboxamides, such as N-vinyl-N-methylformamide, N-vinylacetamide, N-vinyl-N-methylacetamide, N-vinyl-N-ethylformamide, N-vinyl-N-propylformamide, N-vinyl-N-isopropylformamide, N-vinyl-N-isobutylformamide, N-vinyl-N-methylpropionamide, N-vinyl-N-butylacetamide and N-vinyl-N-methylpropionamide.

Other suitable comonomers for N-vinylformamide are monoethylenically unsaturated carboxylic acids having from 3 to 8 carbon atoms and the water-soluble salts of these monomers. This group includes, for example, acrylic acid, methacrylic acid, dimethylacrylic acid, ethacrylic acid, maleic acid, citraconic acid, methylenemalonic acid, allylacetic acid, vinylacetic acid, crotonic acid, fumaric acid, mesaconic acid and itaconic acid. Of this group of monomers, preference is given to using acrylic acid, methacrylic acid, maleic acid or also mixtures of said carboxylic acids, in particular mixtures of acrylic acid and methacrylic acid. The unsaturated carboxylic acids can be polymerized either in free form or in partially or in completely base-neutralized form, e.g. using sodium hydroxide solution, potassium hydroxide solution, calcium hydroxide or ammonia.

Examples of other suitable comonomers are esters, amides and nitriles of said carboxylic acids. The acrylic and methacrylic esters are preferably derived from saturated, monohydric alcohols having from 1 to 4 carbon atoms or saturated dihydric alcohols containing from 2 to 4 carbon atoms. Examples of these esters are methyl acrylate, methyl methacrylate, ethyl acrylate, ethyl methacrylate, n-propyl acrylate, n-propyl methacrylate, propyl acrylate, isopropyl methacrylate and the esters of acrylic acid and methacrylic acid derived from isomeric butanols, for example hydroxyethyl acrylate, hydroxyethyl methacrylate, hydroxypropyl acrylate, hydroxypropyl methacrylate, hydroxybutyl acrylate, hydroxyisobutyl acrylate and hydroxyisobutyl methacrylate. Others which can be mentioned are acrylamide, methacrylamide, N,N-dimethylacrylamide, N-tert-butylacrylamide, acrylonitrile, methacrylonitrile, dimethylaminoethyl acrylate, dimethylaminoethyl methacrylate, diethylaminoethyl acrylate, diethylaminoethyl methacrylate and the salts of the last-named monomers with carboxylic acids or mineral acids and also the quaternized products.

Other comonomers which can be used for the copolymerization of N-vinylformamide are vinylesters, such as vinyl formate, vinyl acetate and vinyl propionate. Also suitable are N-vinylpyrrolidone, N-vinylcaprolactam, 1-vinylimidazole, 2-methyl-1-vinylimidazole and 4-methyl-1-vinylimidazole, vinylsulfonic acid, allylsulfonic acid, methallylsulfonic acid, styrenesulfonic acid, vinylphosphonic acid, allylphosphonic acid and diallyldimethylammonium chloride. It is of course also possible to use mixtures of said monomers.

Said comonomers can be present in copolymerized form, for example in an amount from 1 to 99 mol %, in the copolymers containing N-vinylformamide.

Moreover, homo- and copolymers of N-vinylformamide can be modified by carrying out the polymerization in the presence of compounds which have at least two ethylenically unsaturated nonconjugated double bonds in the molecule. The co-use of these monomers in the polymerization increases the molecular weight of the polymer. Examples of particularly suitable compounds are alkylenebisacrylamides such as methylenebisacrylamide and N,N'-acryloylethylenediamine, N,N'-divinylethyleneurea, N,N'-divinylpropyleneurea, ethylidenebis-3-(N-vinylpyrrolidone), N,N'-divinyldiimidazolyl-(2,2')butane and 1,1'-bis(3,3'-vinylbenzimidazolin-2-one)-1,4-butane. Other suitable crosslinkers are, for example, alkylene glycol di(meth)acrylates such as ethylene glycol diacrylate, ethylene glycol dimethacrylate, tetraethylene glycol diacrylate, tetraethylene glycol dimethacrylate, diethylene glycol acrylate, diethylene glycol methacrylate, aromatic divinyl compounds such as divinylbenzene and divinyltoluene and vinyl acrylate, allyl acrylate, allyl methacrylate, divinyldioxane, pentaerythritol triallyl ether and mixtures of the crosslinkers. The crosslinkers are used in amounts of from 0.1 to 10% by weight, preferably from 1 to 4% by weight, based on the monomers used in the polymerization.

Another option for modification is the grafting of N-vinylformamide to other polymers. To prepare such graft polymers, N-vinylformamide, optionally together with other, previously mentioned comonomers in the presence of the graft base, is polymerized in the abovedescribed manner. U.S. Pat. No. 5,334,287 describes, for example, the grafting of N-vinylformamide onto natural substances based on saccharides. Suitable graft bases for this purpose are mono- and oligosaccharides such as glucose, fructose, galactose, ribose, mannose, sucrose, lactose and raffinose or polysaccharides such as pectin, algin, chitin, chitosan, heparin, agar, gum arabic, carob seed grain, guar gum, xanthan, dextran and the like and also pentosanes such as xylan and araban. Also suitable are native starches from the group consisting of corn starch, potato starch, wheat starch, rice starch, tapioca starch, sago starch, sorghum starch, cassava starch, pea starch or those starches which have an amylopectin content of at least 80% by weight, such as waxy corn starch or waxy potato starch, enzymatically or hydrolytically degraded starches, such as white and yellow dextrins and maltodextrins, or also oxidized starches, for example dialdehyde starch. Finally, in this series, mention must also be made of chemically modified saccharides, such as carboxymethylcellulose.

Other suitable graft bases are polymers which contain alkylene oxide units, in particular homo- and copolymers of $C_2$- to $C_4$-alkylene oxides, which are obtainable by polymerization of ethylene oxide, propylene oxide, n-butylene oxide, isobutylene oxide or tetrahydrofuran. Such polyalkylene oxides are described in DE-A-19515943. These polymers may also be addition products of $C_2$- to $C_4$-alkylene oxides with predominantly long-chain alcohols, phenols, carboxylic acids and amines. DE-A-19526626 discloses corresponding graft polymers on polymers which contain units of vinyl esters of saturated $C_1$- to $C_4$-carboxylic acids, such as vinyl formate, vinyl acetate, vinyl propionate and vinyl n-butyrate, and/or vinyl alcohol units.

The polymers containing N-vinylformamide units are prepared by the known processes of solution, precipitation, suspension or emulsion polymerization using compounds which remain free radicals under the polymerization conditions. The polymerization temperatures are usually in the range from, for example, 30 to 200° C., preferably from 40 to 110° C. Examples of suitable initiators are azo and peroxy compounds and the customary redox initiator systems, such as combinations of hydrogen peroxide and hydrazine. These systems can optionally additionally also contain small amounts of a heavy-metal salt. The polymerization initiators used are preferably water-soluble azo compounds, such as 2,2'-azobis(2-methylpropionamidine)dihydrochloride, 2,2'-azobis(4-methoxy-2,4-dimethylcaleronitrile) and 2,2'-azobis(2-methyl-N-phenylpropionamidine)dihydrochloride. In order to prepare polymers with a low K value, the polymerization is expediently carried out in the presence of regulators, for example mercapto compounds, allyl compounds, aldehydes or hydrazine.

The polymers which can be obtained in this way have K values of from 10 to 300, preferably from 30 to 250. The K values are determined according to H. Fikentscher, Cellulose-Chemie, (1932), Volume 13, 58 to 64 and 71 to 74, in 5% strength aqueous sodium chloride solution at a pH of 7, a temperature of 25° C. and a polymer concentration of 0.1% by weight.

In order to remove formamide from polymers containing N-vinylformamide units, the polymers are treated according to the invention with from 1 to 2 mole-equivalents of an acid or a base, based on 1 mole-equivalent of formamide in the polymer. The hydrolysis is carried out such that N-vinylformamide units and other hydrolyzable units in the polymer are essentially unchanged. The acid used is, for example, a mineral acid, carboxylic acid, sulfonic acid or mixtures of said acids. Suitable mineral acids are, for example, halogenated hydrocarbons which can be used in gaseous form or in a clear solution. Preference is given to using hydrochloric acid, sulfuric acid, nitric acid or phosphoric acid. Of the carboxylic acids, formic acid and acetic acid are particularly suitable. Also suitable are aliphatic or aromatic sulfonic acids. The pH during the acidic hydrolysis is, for example, from 0 to 5 and is preferably in the range from 0 to 3. Per formamide equivalent, from 1 to 2, preferably from 1.5 to 1.8, mole-equivalents of an acid are required.

The hydrolysis can also be carried out using bases, e.g. using metal hydroxides, in particular using alkali metal or alkaline earth metal bases, ammonia or amines. Preferred bases are sodium hydroxide and potassium hydroxide. The hydrolysis of formamide can also be carried out with ammonia or amines such as, for example, butylamine, ethanolamine or triethanolamine. In the basic hydrolysis, per formamide equivalent, from 1 to 2, preferably from 1.2 to 1.5, mole-equivalents of a base are required. The pH during the basic hydrolysis is, for example, from 9 to 12 and is preferably in the range from 10 to 11.

The treatment with acids or bases removes the unwanted formamide from polymer solutions, polymer suspensions or polymer emulsions. The treatment of the polymers preferably takes place in an aqueous medium at from 20 to 90° C., preferably from 50 to 80° C. The reaction time is, for example, from 0.5 to 5 hours, in most cases from 2 to 4 hours. Under these reaction conditions, a maximum of 3%, usually from 0 to 2%, of the copolymerized N-vinylformamide units are hydrolyzed. Immediately after the formamide has been hydrolyzed, the reaction mixture is adjusted to a pH of, for example, from 4 to 8.5, preferably from 5 to 8, using bases if hydrolysis has been effected using acids. If hydrolysis of the formamide has been carried out using bases, the reaction mixture is neutralized with an acid and the pH is adjusted to be preferably in the range from 5 to 8.

It was unexpected that, under the reaction conditions given above, formamide alone is hydrolyzed, and not the N-vinylformamide units in the polymers, at least not to a significant extent. The polymers containing N-vinylformamide units treated by the novel process either contain no formamide or contain it only in traces, e.g. in amounts of less than 100 ppm.

The K value for the polymers given in the examples was determined by H. Fikentscher, Cellulose-Chemie, (1932), Volume 13, 58–64 and 71–74, in 5% strength aqueous sodium chloride solution at a pH of 7, a temperature of 25° C. and a polymer concentration of 0.1% by weight. The formamide content of the polymers was measured before and after treatment using high pressure liquid chromatography. The amount of formate formed in the hydrolysis was determined enzymatically. The amount which is released from formamide is used to calculate the degree of hydrolysis for the copolymerized N-vinylformamide units.

EXAMPLE 1

A stirred apparatus fitted with a reflux condenser and a thermometer was charged with 500 g of a 20.4% strength by weight aqueous solution of a polyvinylformamide with a K value of 90 and a formamide content of 0.37% by weight (41.1 mmol). 7.1 g (73.9 mmol) of 38% strength hydrochloric acid were added, and the reaction mixture was heated at 80° C. for 4 hours. After this time, the formamide content was determined. It was 0.05% by weight. The degree of hydrolysis of the N-vinylformamide units was 1.0%.

EXAMPLE 2

A stirred apparatus fitted with a reflux condenser and a thermometer was charged with 500 g of a 20.4% strength by weight aqueous solution of a polyvinylformamide having a K value of 90 and a formamide content of 0.37% by weight (41.1 mmol). 7.2 g (45.0 mmol) of a 25% strength by weight sodium hydroxide solution were then added, and the reaction mixture was heated at 80° C. for 4 hours. Analysis revealed a formamide content of 0.09% by weight and a degree of hydrolysis of the N-vinylformamide units in the polymer of 1.0%.

EXAMPLE 3

Example 2 is repeated except that 9.2 g (57.5 mmol) of a 25% strength aqueous sodium hydroxide solution are added to the aqueous solution of the polyvinylformamide. After a reaction time of 4 hours, formamide is no longer detectable. The degree of hydrolysis of the N-vinylformamide units of the polymer was 1.4%.

EXAMPLE 4

Example 2 is repeated except that 11.5 g (71.9 mmol) of a 25% strength aqueous sodium hydroxide solution are added to the aqueous solution of the polyvinylformamide. After a reaction time of 4 hours, formamide was no longer detectable. The degree of hydrolysis of the N-vinylformamide units of the polymer was 2.9%.

We claim:
1. A process for the elimination of formamide impurities from polymers containing N-vinylformamide units, which comprises treating polymers containing formamide impurities with from 1 to 2 mole-equivalents, based on 1 mole-equivalent of the formamide impurities, of an acid or a base under reaction conditions such that a maximum of 3% of the N-vinylformamide units in the polymer are hydrolyzed.

2. A process as claimed in claim 1, wherein from 1.5 to 1.8 mole-equivalents, based on 1 mole-equivalent of the formamide impurities, of an acid are used.

3. A process as claimed in claim 1, wherein the acids used are mineral acids, carboxylic acids, sulfonic acids or mixtures of said acids.

4. A process as claimed in claim 1, wherein from 1.2 to 1.5 mole-equivalents, based on 1 mole-equivalent of the formamide impurities, of a base are used.

5. A process as claimed in claim 1, wherein the bases used are alkali metal or alkaline earth metal bases, ammonia or amines.

6. A process as claimed in claim 1, wherein the treatment of the polymers is carried out in an aqueous medium at from 20 to 90° C.

7. A process as claimed in claim 1, wherein the treatment of the polymers is carried out in an aqueous solution at from 50 to 80° C.

8. A process as claimed in claim 6, wherein from 1.5 to 1.8 mole-equivalents, based on 1 mole-equivalent of the formamide impurities, of an acid are used.

9. A process as claimed in claim 6, wherein the acids used are mineral acids, carboxylic acids, sulfonic acids or mixtures of said acids.

10. A process as claimed in claim 6, wherein from 1.2 to 1.5 mole-equivalents, based on 1 mole-equivalent of the formamide impurities, of a base are used.

11. A process as claimed in claim 6, wherein the bases used are alkali metal or alkaline earth metal bases, ammonia or amines.

* * * * *